United States Patent [19]

Torre

[11] 4,236,933

[45] Dec. 2, 1980

[54] PROCESS FOR PHTHALOCYANINE GREEN PIGMENT

[75] Inventor: Salvatore F. Torre, South Plainfield, N.J.

[73] Assignee: American Cyanamid Company, Stamford, Conn.

[21] Appl. No.: 74,182

[22] Filed: Sep. 10, 1979

[51] Int. Cl.$^3$ ................................................ C08K 5/34
[52] U.S. Cl. ............................ 106/288 Q; 106/308 N
[58] Field of Search ................ 106/288 Q, 308 N, 23; 260/314.5

[56] References Cited

U.S. PATENT DOCUMENTS

| 3,754,958 | 8/1973 | Giambalvo | 106/288 Q |
| 3,960,587 | 6/1976 | Huille et al. | 106/288 Q |
| 4,133,695 | 1/1979 | Wheeler | 106/288 Q |

OTHER PUBLICATIONS

Moser, F. H. et al. *Phthalocyanine Compounds* pub. by Rheinhold Pub. Corp. NYC (1963) pp. 171 and 179–180.

*Primary Examiner*—Helen M. McCarthy
*Attorney, Agent, or Firm*—Bruce F. Jacobs

[57] ABSTRACT

A green copper phthalocyanine pigment composition suitable for rotogravure inks is obtained by adding to the green pigment about 5 to 10% of a water soluble blue copper phthalocyanine dye which is complexed with N-alkyltrimethylammonium chloride.

8 Claims, No Drawings

PROCESS FOR PHTHALOCYANINE GREEN PIGMENT

The present invention relates to a green shade copper phthalocyanine pigment, particularly for use in rotogravure ink (solvent ink) systems, characterized by high gloss and high transparency, and to a process for its preparation.

Green shade copper phthalocyanine pigments containing at least 15 halogen atoms (chlorine or bromine) such as C.I. Pigment Green 7 (Color Index No. 74,260) which is a polychlorinated copper phthalocyanine containing 15 or 16 chlorine atoms per molecule, are useful herein. When used in a rotogravure ink system, masstones are flat.

The present invention is based on the discovery that the addition of a non-pigmentary, blue sulfonated copper phthalocyanine dye complexed with an N-alkyltrimethylammonium chloride compound to the green pigment results in a pigment composition which, when used in a rotogravure masstone ink, provides both high gloss and high transparency.

The invention is surprising since it would have been expected that the addition of a blue dye to a green pigment would result in a bluer, dirtier shade of green when used in rotogravure ink. The fact that the blue dye does not change the shade but, rather, increases gloss and transparency in rotogravure inks is believed to be unexpected.

Green shade copper phthalocyanine pigments, identified above, are well-known and redily prepared by known methods. A suitable method is by the chlorination of copper phthalocyanine with chlorine in a eutectic NaCl-AlCl$_3$ mixture at 180-200° C., using FeCl$_3$ or CuCl$_2$ as catalyst; or, in molten phthalic anhydride; or, suspended in a "fluidized bed" at 180-200° C; or, by heating copper phthalocyanine in sulfur dichloride under pressure at 150-175° C. Most commercial grades contain 15 chlorine atoms per molecule. By converting tetrachlorophthalic anhydride to hexadecachloro copper phthalocyanine (U.S. Pat. No. 2,549,842), a product containing 16 chlorine atoms per molecule is obtained. Products with bromine atoms may be made by similar methods.

The invention may be practiced using the green coper phthalocyanine pigment per se or by using a crude, non-pigmentary, highly aggregated presscake. In the latter case, described herein, the presscake. In the latter case, described herein, the presscake is first converted to a pigmentary form by the well-known flushing procedure. In the flushing procedure, the crude presscake, water, one or more surfactants, and a flushing (or breaching) agent are refluxed to convert the crude green to pigmentary form. The flushing agent is then removed by distillation. Any suitable surfactant or surfactants may be used for this purpose. Examples include sodium oleate and hexylene glycol. Any suitable flushing agent may be used, examples of which include monochlorobenzene, dichlorobenzene, trichlorobenzene, nitrobenzene, aniline, halogenated aliphatic compounds, and the like. Monochlorobenzene is preferred.

Following flushing, the aqueous dispersion of green copper phthalocyanine pigment is mixed with about 5 to 10 percent by weight thereof (dry basis) of a water soluble blue sulfonated copper phthalocyanine dye compound. These compounds generally contain an average of at least 1.8 sulfonic acid groups per molecule, and at least a complexing amount, though preferably an excess (up to about 20%), of an N-alkyltrimethylammonium chloride compound and dufficient sulfuric acid to render the pH below about 4. The acidic mixture is then heated at a suitable temperature (about 90-95° C.) for a period of time sufficient to complex the N-alkyltrimethylammonium chloride compound with the sulfonated dye. The pigment is then filtered, washed with water, and dried.

The blue sulfonated copper phthalocyanine dye, containing an average of at least 1.8, preferably 2 to 3, slufonic acid groups per molecule, is generally a mixture of mono-, di-, tri-, and tetrasulfonated copper phthalocyanines made by know methods by ulfonation of copper phthalocyanine in oleum (see Color Index numbers 74,180; 74,200; 74,220). The sulfonated copper phthalocyanines used herein are water soluble. Those having less than an average of about 1.8 sulfonic acid groups per molecule may not be water soluble or else may tend to make the shade of the green pigment bluer and are generally avoided.

Since the sulfonated copper phthalocyanine dye used in the invention is water soluble, it is complexed with at least one N-alkyltrimethylammonium chloride compound under acidic conditions. The complexation renders the dye essentially water-insoluble. For purposes of the invention, N-dodecyltrimethylammonium chloride is preferred, but other N-alkyltrimethylammonium chloride compounds wherein the alkyl group contains about 8 to 18 carbon atoms are useful. The compound is preferably used in exces, i.e., an exces, by weight, of up to about 20% of the total amount necessary to complex with the sulfonic acid groups. The purpose of the excess surfactant is to provide greater ease of filtration of the product and to aid in pigment dispersion. The invention is more fully illustrated by the following examples.

EXAMPLE 1

One part (40 grams dry basis) of crude copper phthalocyanine green pigment presscake (highly aggregated), 2.5 parts (100 grams) of water, 0.04 part (3.2 grams) of 50% sodium hydroxide solution, 0.08 part (3.2 grams) of oleic acid, 0.05 part (2.0 grams) of hexylene glycol, and 4 parts (160 grams) of monochlorobenzene were refluxed at 92-93° C. for 2 hours. The monochlorobenzene ws then removed by distillation and 0.05 part (2 grams dry basis) of sulfonated copper phthalocyanine (Turquoise Blue B—American Cyanamid Company), 0.5 part (20 grams) of 96% sulfuric acid (added at 80-90° C.) and 0.07 part (5.4 grams) of a 50% solution of N-dodecyltrimethylammonium chloride (Arquad 12—Armak Company) were added. The mixture was heated at 90-95° C. for about 2 hours, the product was filtered, washed with water, and dried.

EXAMPLE 2

Rotogravure Type C Ink Evaluation

A composite vehicle is prepared by milling the following:

|  | Grams |
| --- | --- |
| Dibutyl phthalate | 4.5 |
| ¼" SS nitrocotton (70% real, alcohol wet) | 22.7 |
| Ethyl acetate | 22.7 |
| Ethyl alcohol | 79.7 |
| Isopropyl alcohol | 6.7 | until a complete solution is formed. Ink formulations are prepared by milling 28.6 grams of the pigment of Example 1 (and, for comparison purposes, an unmodified green pigment), 136.3 grams of composite vehicle, and 1000 grams of ¼" steel balls in a 16 ox jar sealed with plastic film for 16 hours at 88 ± rpm. The jar is opened, 13.6 grams of ethyl alcohol added, the jar resealed and milled again for 24 hours.

The jar is again opened, 30.8 grams of ethyl alcohol and 20.0 grams of ethyl Cellosolve added, and the sealed container again milled for 30 minutes and discharged.

Displays are prepared with this masstone ink using a No. 6 round laboratory coating rod on paper-backed aluminum foil and on clear cellulose acetate film.

When evaluated as described, the ink made using the modified green pigment of Example 1 was glossier and more highly transparent than the ink using the unmodified pigment.

What is claimed is:

1. A green shade copper phthalocyanine pigment composition comprising a green copper phthalocyanine pigment having at least 15 halogen atoms per molecule, about 5 to 10% by weight, based on the weight of the pigment, of a non-pigmentary water soluble blue sulfonated copper phthalocyanine dye wherein the sulfonated dye contains at least about 1.8 sulfonic acid groups per molecule, and at least a complexing amount of an N-alkyltrimethylammonium chloride, wherein the alkyl group contains about 8 to 18 carbon atoms, to complex the sulfonic acid groups of the dye.

2. The composition of claim 1 wherein the halogen atoms are chlorine or bromine or a mixture thereof.

3. The composition of claim 1 wherein the halogen atoms are chlorine.

4. The composition of claim 1 wherein the sulfonated dye contains on the average about 2 to 3 sulfonic acid groups per molecule.

5. The composition of claims 1 or 4 wherein the alkyl group contains 12 carbon atoms.

6. A rotogravure ink comprising the composition of claims 1 or 5 in an oppropaiate vehicle.

7. A process for the preparation of a green shade copper phthalocyanine pigment composition which comprises: (1) forming a dispersion of a green copper phthalocyanine pigment containing at least 15 halogen atoms per molecule in water; (2) adding thereto about 5 to 10 percent by weight, based on the dry weight of said green pigment, of a water soluble blue sulfonated copper phthalocyanine dye wherein the sulfonated dye contains at least about 1.8 sulfonic acid groups per molecule and at least a complexing amount of an N-alkyltrimethylammonium chloride compound, wherein the alkyl group contains about 8 to 18 carbon atoms, and sufficient sulfuric acid to render the pH below about 4; (3) heating said mixture at a temperature of about 90–95° C for a time sufficient for compelxation of said sulfonated copper phthalocyanine dye with said N-alkyltrimethylammonium chloride; and (4) isolating said green pigment composition from said mixture.

8. The process of claim 7 wherein said N-alkyltrimethylammonium chloride is N-dodecyltrimethylammonium chloride.

* * * * *